Sept. 22, 1959 G. C. SZIKLAI 2,905,754

MAGNETIC SWITCHING CIRCUITS

Filed Dec. 20, 1956

INVENTOR.
George C. Sziklai
BY
[signature]
ATTORNEY 2,905,754
Patented Sept. 22, 1959

2,905,754

MAGNETIC SWITCHING CIRCUITS

George C. Sziklai, Princeton, N.J., assignor to Radio Corporation of America, a corporation of Delaware Application December 20, 1956, Serial No. 629,501
6 Claims. (Cl. 178—5.4)

Figures 1, 2, 3, 4:
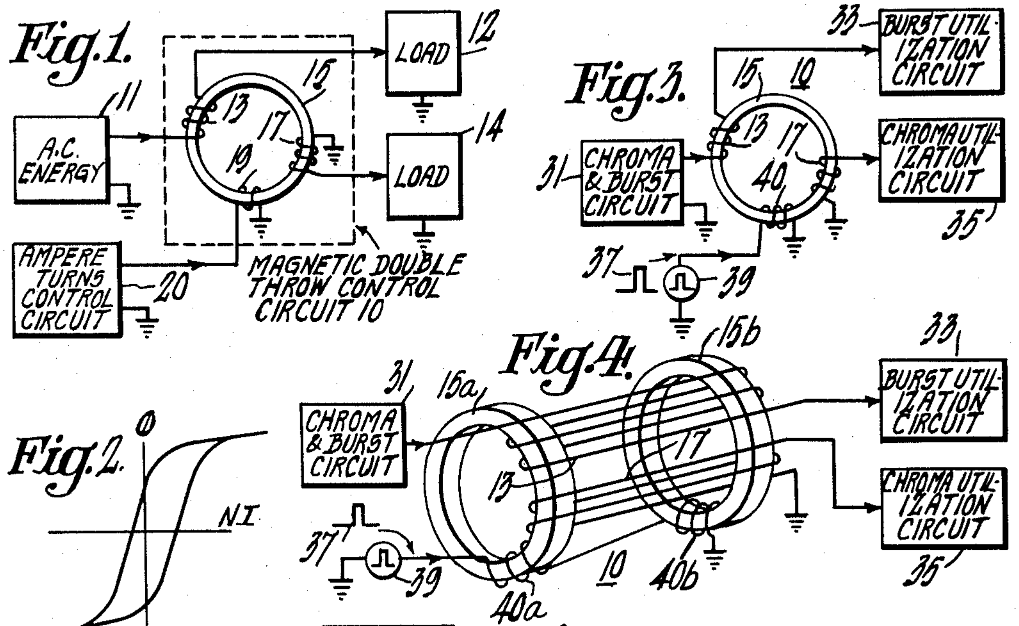

The present invention relates to a novel high-frequency, double-throw magnetic switch and more particularly, but not exclusively, to a magnetic double-throw switching device to alternately switch different portions of a video signal into different circuits.

In many types of electrical circuits it is often required that a simple double-throw circuit be provided for the switching or multiplexing of sequentially-produced signal information or alternating current power to different output circuits during selected time intervals. Such a double-throw circuit is particularly useful in a color television receiver wherein a chrominance signal, which contains color difference signal information, and color synchronizing bursts, which convey reference phase synchronizing information, occur during different time intervals of the color television signal and are processed in different signal channels in the color television receiver.

It is therefore an object of the invention to provide a novel double-throw magnetic switching device.

It is another object of the invention to provide a novel magnetic device for switching the chrominance portion of a color television signal into a chrominance signal channel and the burst portion of a color television signal to a burst channel.

According to the invention, electrical energy is inductively coupled by a magnetic device to a first load and coupled by a controllable series impedance provided by the magnetic device to a second load. The inductive coupling and the series impedance are simultaneously controllable by controlling the ampere turns in the magnetic device whereby at one value of ampere turns, the inductive coupling and the series impedance are reduced to a minimum, thereby providing energy transfer to only the second load. At another value of ampere turns, the inductive coupling and the series impedance are both maximum providing energy transfer to principally the first load.

In one form of the invention, a color information signal, including a chrominance signal occurring between retrace intervals, and color synchronizing bursts, which occur during retrace intervals, are applied to a first winding on an iron core. A first load is coupled in series with the first winding; a second load is inductively coupled to a second winding by the above iron core. The iron core is caused to be saturated during burst time thereby decoupling the first and second windings and also reducing a series impedance of the first winding which is coupled to the first load so that the bursts will be translated to the first load. The iron core is caused to be unsaturated at least during each retrace interval so that the chrominance signal occurring during that interval is inductively coupled from the first winding to the second winding with the series impedance of the first winding relative to the first load caused to be of such magnitude so that substantially no chrominance signal energy is developed across the first load.

Figure 5:
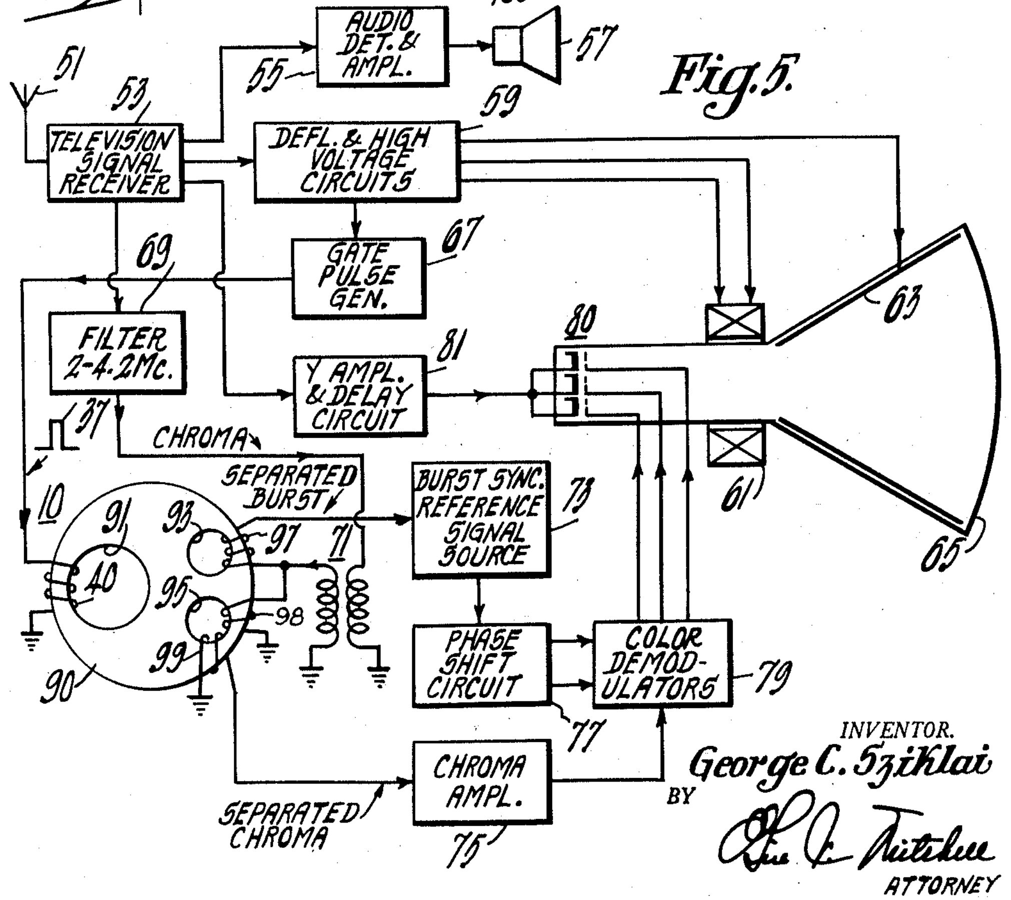

Other and incidental objects of the invention become apparent on the reading of the following specification and the study of the figures where:

Figure 1 is a diagram of a circuit of a double-throw magnetic switch of the present invention; and Figure 2 is a diagram relating the flux and the ampere turns of the iron core of the circuit of Figure 1; and Figures 3 and 4 are diagrams of magnetic chroma and burst switches of the present invention; and Figure 5 is a diagram of a color television receiver using a magnetic chroma and burst switch of the present invention.

Figure 1 is a diagram showing one form of the present invention. A source 11, which provides alternating current energy, is coupled to the winding 13 on the iron core 15. The iron core 15 and the aforementioned winding 13 and also the output winding 17 and an ampere-turns control winding 19 form the magnetic double-throw control circuit 10.

The winding 13, to which the source 11 is coupled, forms a series impedance between the source 11 and the load 12. The load 14 is coupled to the output winding 17. An ampere-turns control circuit 20 is coupled to the ampere-turns control winding 19 and is capable of controlling the current through the ampere-turns control winding and therefore the ampere-turns exciting the iron core 15 and the flux $\phi$ produced thereby in the iron core 15.

The ampere-turns, designated as NI where N is the total number of turns on the iron core 15 and I is the total current through these windings, is related to the flux $\phi$ in the iron core 15 by the curve shown in Figure 2. The curve of Figure 2 is a hysteresis curve; for both large and small values of ampere turns NI, the iron core 15 will saturate.

While the iron core 15 is saturated, substantially no inductive coupling will be provided between the winding 13 and the output winding 17. In addition, when the iron core 15 is saturated, the inductance of the winding 13 will be at a minimum value thereby providing a path of minimum impedance and reactance between the source 11 of the alternating current energy and the load 12.

The circuit of Figure 1 operates in the following fashion: When the ampere-turns control circuit 20 passes current through the ampere-turns control winding 19 so that the iron core 15 is saturated, then as is pointed out above, no coupling is provided between the source 11 of the alternating current energy and the load 14 if the design of the winding 13 is such that during saturation the inductance and therefore the reactance of the winding 13 will be small compared to the impedance of the load I, and the alternating current energy from the source 11 will pass to load 12.

When the current through the ampere-turns control winding 19 has a magnitude whereby the iron core 15 is not saturated, then the inductance and therefore the reactance of the winding 13 becomes very large as compared to the impedance of load 12, and substantially no alternating current energy is transferred from the source 11 to the load 12. Also, when the iron core 15 is not saturated, inductive coupling is possible between the winding 13 and the output winding 17, and the alternating current energy from the source 11 will thereupon pass to load 14.

Different values of current through the ampere-turns control winding 19, as provided by the ampere-turns control circuit 20, cause the winding 13 to provide different amounts of inductance and therefore reactance coupling the source 11 to the load 12, and also cause different values of inductive coupling between the winding 13 and the output winding 17. Therefore, the magnetic double-throw control circuit 10 of Figure 1 operates as a device to switch the alternating current energy between loads 12 and 14 during prescribed time intervals or to control the relative amount of energy coupled from the source 11 of alternating current energy to each of loads I and II.

Figure 3 is a magnetic double-throw control circuit 10 of the present invention which is useful for switching the burst and chroma portions of a color information signal into their respective utilization circuits in a color television receiver.

The chrominance signal is a modulated subcarrier wherein modulations representative of different color difference signals occur at different phases of the chrominance signal. One or more of the color difference signals may be demodulated by using synchronous demodulators. The color synchronizing bursts are generated following the horizontal synchronizing pulse in the color television signal.

In many types of color television receivers, a burst gate circuit is used to gate the color synchronizing bursts from the color television signal into a burst utilization circuit. A conventional burst gate circuit functions approximately 4% of the time. In many types of color television receivers, means are also provided for preventing the color synchronizing bursts from passing to the chrominance signal utilization circuit to thereby prevent information derived from the bursts from being reproduced by a color image reproducer during each retrace interval and to prevent such circuits as D.C.-restorers, which may be utilized in the chrominance utilization circuit, from clamping onto a demodulated synchronizing burst. The present invention eliminates the need for both a single burst gate circuit and also a circuit for preventing color synchronizing burst information from being processed in the chrominance signal utilization circuit by performing these functions with a single magnetic double-throw circuit of the present invention.

In the circuit of Figure 3, a chroma and burst circuit 31 provides a color information signal, which includes the chrominance signal between retrace intervals and the color synchronizing bursts during retrace intervals, to the winding 13 of the iron core 15. As in the case of the circuit of Figure 1, the winding 13 presents a series path between the chroma and burst circuit 31 and the burst utilization circuit 33, with the inductance of the winding 13 and therefore the series impedance presented by the winding 13 in the aforementioned path, a function of the flux in the iron core 15. The output winding 17 is coupled to the chroma utilization circuit 35. A pulse 37, having a time duration which is substantially equal to and in time coincidence with the color synchronizing burst produced during the retrace interval, is provided by the source 39 to the switching winding 40, which corresponds to the winding 19 of the circuit of Figure 1.

During the time intervals between successive pulses 37, the iron core 15 is unsaturated. The chrominance signal which occurs during these time intervals, is coupled from the winding 13 to the output winding 17 and therefrom to the chroma utilization circuit 35; the series impedance of the winding 13 is also caused to be of such magnitude that no chrominance signal information of significant amplitude is developed in the burst utilization circuit 33. During each pulse 37, the iron core 15 is caused to be saturated. The coupling from the winding 13 to the output winding is therefore reduced to substantially zero, and the inductance of the winding 13 is reduced to a minimum value; the color synchronized bursts, which occur during the pulse 37, are developed in the burst utilization circuit 33.

Figure 4 shows another form of magnetic double-throw control circuit wherein means are provided to prevent the pulse 37 from being developed in the chroma utilization circuit 35. The circuit of Figure 4 shows a pair of iron cores 15*a* and 15*b*. In the drawing the spacing between the iron cores is exaggerated so as to emphasize the fact that different iron cores are used. The winding 13 and the output winding 17 are wound about both iron cores 15*a* and 15*b* so that each is, essentially speaking, wound in series. The switching winding corresponding to the switching winding 40 of Figure 3 consists here of a first winding 40*a* on the iron core 15*a* and a winding 40*b* on the iron core 15*b*. The switching windings 40*a* and 40*b* are wound in opposing sense on the cores 15*a* and 15*b* so that, whereas the pulse 37 is capable of saturating both iron cores 15*a* and 15*b*, voltages induced by the pulse in the winding 13 and in the output winding 17 will be cancelled.

The embodiment of the present invention shown in Figure 4 represents only one means for providing information for eliminating pulse information in the circuits to which alternating current information, such as the chrominance signal or the bursts, are to be transferred. Other configurations, such as a double-window iron core, or a core circuit using a bucking winding for the winding through which the alternating current energy is applied, may also be utilized.

Figure 5 is a diagram of a color television receiver which uses a magnetic double-throw control circuit 10 of the present invention for gating the bursts of a color television signal into a burst channel and for gating a chrominance signal derived from a color television signal into only the chrominance channel.

In the color television receiver of Figure 5, the incoming signal arrives in the antenna 51 and is applied to the television signal receiver 53. The television signal receiver 53 detects the color television signal which includes not only the aforementioned chrominance and color synchronizing burst signals but also a wideband luminance signal which indicates the brightness information of a televised image and which, when combined with a color difference signal, produces a component color signal which indicates the color content of a televised image at the corresponding color specified by the color difference signal. The color television signal also includes deflection synchronizing pulses and also an audio-modulated, frequency-modulated carrier which is transmitted 4½ mc. removed from the picture carrier of the incoming signal.

The audio-modulated, frequency-modulated carrier is demodulated, using for example, an intercarrier sound circuit in the audio detector and amplifier 55, wherein it is also amplified. The amplified audio information is applied to the loudspeaker 57.

The color television signal is applied to the deflection and high voltage circuit 59 which separates the deflection synchronizing signals from the color television signal and develops not only horizontal and vertical deflection signals which are applied to the yokes 61 but also a high voltage which is applied to the second anode 63 of the color kinescope 65.

The deflection and high voltage circuit 59 also energizes the gate pulse generator 67 to produce the pulse 37. The gate pulse generator 67 may consist of an auxiliary winding on a transformer in the deflection and high voltage circuit 59 or may consist of a multivibrator which is actuated by horizontal synchronizing pulses. As mentioned in connection with the circuit of Figure 3, the pulse 37 is developed with a time interval which is substantially in time coincidence with the time interval during which each color synchronizing burst occurs in the color television signal.

The color television signal is applied to the filter 69 which passes only that frequency band of the color television signal between approximately 2–4.2 mc. The components derived therefrom comprise the chrominance signal or chroma. The chrominance signal is applied to the transformer 71 which forms a driving circuit for the magnetic double-throw control circuit 10 of the present invention. The pulse 37 is applied to the magnetic double-throw circuit 10 of the present invention with that circuit 10 providing separated bursts to the burst synchronized reference signal source 73 and separated chroma to the chroma amplifier 75. A detailed description of the operation of the magnetic double-throw control circuit 10 illustrated in Figure 5 is deferred until later in the specification.

The burst synchronized reference signal source 73 applies a reference signal, which is phase synchronized by the bursts to a phase shift circuit 77. The phase shift circuit 77 applies properly phased demodulating signals, derived from the reference signal, to the color demodulators 79. The chroma amplifier 75 applies the amplified chrominance signal to the color demodulators 79 which thereupon develop a trio of color difference signals, such as red, green, and blue color difference signals. These color difference signals each describe how the corresponding color contents of the televised scene differs from the color information already included in the brightness of the luminance signal. The red, green, and blue color difference signals, developed by the color demodulator 79, are thereupon applied to the control grids of the electron guns 80 of the color kinescope 65.

The luminance signal in the form of the detected color television signal is applied to the cathodes of the electron guns 80 by way of the Y amplifier and delay circuit, so that signal addition of the luminance signal and the proper color difference signal will take place in each of the electron guns of the color kinescope 65.

Whereas, the signal combination of the luminance and color difference signals has been performed within the envelope of the color kinescope 65 in the circuit of Figure 5, it is to be understood that this signal addition, alternatively, may be performed in circuits external to the color kinescope 65, with the resulting component color information thereupon applied to the electron guns 80.

The magnetic double-throw control circuit 10 of Figure 5 consists of a magnetic device 90 having a large hole 91 and a pair of smaller holes 93 and 95, each of which are located near the outer periphery of the magnetic device 90. The magnetic device 90 is saturable and current provided to, say, the switching winding 40 which threads the large hole 91, may be used to saturate the magnetic material in the vicinity of each of the smaller holes 93 and 95. A winding 97 threads the small hole 93 and forms a series impedance path coupling the chroma transformer 71 to the burst synchronized reference signal source 73.

A winding 98 threads the small hole 95 and is coupled between the chroma transformer 71 and ground. An output winding 99 which is also wound through the small hole 95 and which is not electrically connected to the winding 98, is connected between ground and the chroma amplifier 75.

The magnetic double-throw control circuit of Figure 5 operates in the following fashion. In between the time intervals that the pulses 37 are generated, that is, during the time intervals when the chrominance signal is developed at the output of the filter 69, the magnetic device 90 is not saturated and the chrominance signal is coupled from winding 98 to the output winding 99 and therefrom to the chroma amplifier 75. During this time interval the series impedance of the winding 97 which threads the small hole 93 is sufficiently large to prevent chominance information of appreciable magnitude from being applied to the burst synchronized reference signal source 73.

During each pulse 37 the magnetic device 90 becomes saturated. The inductance of the winding 97 is reduced to a very small value and the color synchronizing bursts, which are developed at the output of the filter 69 during the pulse 37, are coupled to the burst synchronized reference signal source 73. During the pulse 37 the windings 98 and 99 are decoupled in view of the saturation of the magnetic material 90, so that no burst information is passed from the output winding 99 to the chroma amplifier 75.

Having described the invention, what is claimed is:

1. A magnetic switch circuit comprising in combination: a magnetic device having a control circuit, an input circuit, and a first and second output circuit and capable of providing controllable series impedance from said input circuit to said first output circuit and controllable inductive coupling from said input circuit to said second output circuit, said series impedance and said inductive coupling being controllable and responsive to a control signal applied to said control circuit; means to apply alternating current energy to said input circuit; means to apply a control signal having prescribed waveform and timing to said control circuit to control the distribution of said alternating current energy between said first and second output loads.

2. A magnetic double-throw switch comprising in combination: an iron core having a plurality of windings, an input circuit, and first and second output circuits; means to serially connect a first of said windings between said input circuit and said first output circuit; means to couple a second of said plurality of windings to said second output circuit; means to pass current of prescribed waveform having different levels through a third of said plurality of windings to simultaneously control the series impedance presented by said first winding between said input circuit and said first output circuit and the inductive coupling between said first and second of said plurality of windings, whereby for a first level of said waveform said series impedance and said inductive coupling are at minimum values and for a second level of said waveform, said series impedance and said inductive coupling are at a maximum value.

3. In a color television receiver adapted to receive a color television signal including a first color information signal occurring during retrace intervals and a second color information signal occurring between retrace intervals, said color television receiver including a first output circuit for utilizing said first color information signal and a second output circuit for utilizing said second color information signal, a magnetic switching circuit to switch each of said first and second color information signals to their respective utilization circuit, while each of said first and second color information signals occur, comprising in combination: a magnetic switching device having an input terminal and a first and second output terminal and a control terminal and capable of simultaneously providing small series impedance between said input terminal and said first output terminal and a minimum inductive coupling impedance between said input terminal and said second output terminal for a first lever of a control signal applied to said control terminal and for providing a large series impedance between said input terminal and said first output terminal and a maximum inductive coupling impedance between said input terminal and said second output terminal for a second level of said control signal; means to apply said color television signal to said input terminal; means to couple said first and second output terminals to said first and second output circuits, respectively; and means to apply said control signal of said first level to said control terminal during said retrace interval and said control signal at said second level between each of said retrace intervals.

4. In a color television receiver adapted to receive a color television signal including color synchronizing bursts which occur during each retrace interval and a chrominance signal which occurs between each retrace interval, the combination of: a first circuit to provide a color information signal including both said chominance signal and said color synchronizing bursts, a second circuit including apparatus to utilize said chrominance signal when applied thereto, a third circuit including apparatus to utilize said color synchronizing bursts when applied thereto, a magnetic structure on which are wound a plurality of windings, said magnetic structure capable of being saturated by current passed through one of said plurality of windings; means to serially couple said first of said plurality of windings between said first and third circuits; means to couple said second circuit to a second of said plurality of windings; means to apply pulses of current having a duration interval equal to the duration of each color synchronizing burst to a third of said plurality of windings to saturate said magnetic structure during each color synchronizing burst whereby the saturation causes said first winding to provide minimum inductance and increased transmissivity for said bursts to said third circuit while causing minimum inductive coupling between said first and third circuits and whereby the condition of said magnetic structure not being saturated between retrace intervals causes said first winding to provide increased inductance and decreased transmissivity for said chrominance signal to said third circuit and increase inductive coupling of said chrominance signal to said second circuit.

5. A magnetic switch circuit comprising in combination: a magnetic device having an input terminal, a control terminal, and a first and second output terminal, said magnetic device capable of producing flux of controllable intensity responsive to a control potential applied to said control terminal, said magnetic device operatively connected to cause the attenuation of transmission in said magnetic device of an alternating current wave applied to said input terminal and transmitted to each of said first and second output terminals to change in opposite directions responsive to a change in flux intensity due to a corresponding change in control potential applied to said control terminal; means to apply a wave including different alternating current waves which occur during different intervals of time to said input terminal; means to apply a control potential of prescribed wave shape to said control terminal to cause the flux intensity in said magnetic device to change during said different time intervals in which said different alternating current waves occur whereby said different signals are produced at different ones of said first and second output terminals.

6. A magnetic double-throw switch circuit comprising in combination: a magnetic device having an input terminal, a control terminal, and a first and second output terminal, said magnetic device capable of producing a flux condition corresponding to a first condition or to a second condition responsive to different control potentials applied to said control terminal, said magnetic device operatively connected to cause an alternating current wave applied to said input terminal to be translated from said first terminal to only said second output terminal for said first condition of flux and to be translated from said first terminal to only said third output terminal during said second condition of flux; means to apply a wave including first and second alternating current waves which occur during first and second intervals of time, respectively, to said input terminal; means to apply a control potential of prescribed wave shape to said control terminal to cause the flux in said magnetic device to have said first condition during said first interval of time and said second condition during second interval of time.

References Cited in the file of this patent

UNITED STATES PATENTS

| | | |
|---|---|---|
| 2,681,379 | Schroeder | June 15, 1954 |
| 2,736,765 | Lohman | Feb. 28, 1956 |